(12) United States Patent
Boyer et al.

(10) Patent No.: US 7,029,638 B2
(45) Date of Patent: Apr. 18, 2006

(54) DEVICE FOR SEPARATE INJECTION AND HOMOGENEOUS DISTRIBUTION OF TWO FLUIDS

(75) Inventors: Christophe Boyer, Charly (FR); Vincent Coupard, Vaulx en Velin (FR); Gilles Munier, Villeurbanne (FR)

(73) Assignee: Institut Francais de Petrole, Rueil Malmaison Cedex (FR)

( * ) Notice: Subject to any disclaimer, the term of this patent is extended or adjusted under 35 U.S.C. 154(b) by 371 days.

(21) Appl. No.: 10/024,382

(22) Filed: Dec. 21, 2001

(65) Prior Publication Data

US 2002/0081248 A1 Jun. 27, 2002

(30) Foreign Application Priority Data

Dec. 21, 2000 (FR) .................................. 00 16728

(51) Int. Cl.
*B01J 8/02* (2006.01)
*B01D 3/00* (2006.01)
(52) U.S. Cl. ........................................ 422/194; 261/97
(58) Field of Classification Search ................ 422/187, 422/188, 189, 190, 194, 211; 261/97
See application file for complete search history.

(56) References Cited

U.S. PATENT DOCUMENTS

| | | | | |
|---|---|---|---|---|
| 3,946,104 A | * | 3/1976 | Forster et al. | 423/659 |
| 4,568,523 A | * | 2/1986 | Wijffels et al. | 422/191 |
| 4,894,205 A | * | 1/1990 | Westerman et al. | 422/197 |
| 5,799,877 A | * | 9/1998 | Gupta et al. | 239/8 |
| 6,824,675 B1 | * | 11/2004 | Boyer et al. | 208/146 |

FOREIGN PATENT DOCUMENTS

| | | | |
|---|---|---|---|
| EP | 0 602 287 A1 | * | 6/1994 |
| EP | 0602287 | | 6/1994 |
| FR | 2 654 952 | * | 5/1991 |

* cited by examiner

*Primary Examiner*—Kevin P. Kerns
(74) *Attorney, Agent, or Firm*—Millen, White, Zelano & Branigan, P.C.

(57) ABSTRACT

A device that is placed in a vessel for carrying out separate injection (1,6) of two fluids in two different physical states, or which are not miscible, and for homogeneous distribution of at least one of the two fluids in the vessel downstream of said device. The first fluid is injected (6) into the vessel at least one point level with said device, said device being characterized in that it contains a chamber (5) pierced by orifices (7, 8) for the passage of a first fluid. Said chamber (5) is also imperviously traversed by tubes (4) or conduits with a free end acting as a passage through said chamber for the second fluid.

14 Claims, 2 Drawing Sheets

DEVICE FOR SEPARATE INJECTION AND HOMOGENEOUS DISTRIBUTION OF TWO FLUIDS

The present invention relates to a device for separate injection of two fluids, optimising the homogeneity of distribution of said fluids. Said device is disposed in a vessel that may be a distillation column or a reactor.

In the first case, said device can, for example, be used in a plate column or in a packed column. In that case, the first fluid is an essentially gaseous phase and the second fluid is an essentially liquid phase. In this case, the liquid/gas flow is preferably as a counter-current with a gas upflow and liquid downflow. The term "essentially liquid" as used in the present invention means that said phase contains at least 50%, preferably at least 75% and more preferably at least 90% of at least one liquid phase. We shall indiscriminately refer below either to the liquid phase, the liquid or the essentially liquid phase. The term "essentially gaseous phase" means that said phase contains at least 50%, preferably at least 75% and more preferably at least 90% of at least one gaseous phase. We shall indiscriminately refer below either to the gas phase, the gas or the essentially gaseous phase.

In the second case, the device is advantageously placed upstream of a granular bed or between two successive granular beds that comprise solid particles, generally catalytic particles. Preferably, the first fluid is an essentially gaseous phase usually containing hydrogen, at least in part, and the second fluid is an essentially liquid phase comprising hydrocarbons. The distribution systems of the invention are preferably integrated into a fixed bed reactor and the liquid and gas phases flow in a downflowing co-current through said solid granular bed or beds.

We shall indiscriminately refer below to a distributor, to a distributor plate or to distribution systems or devices. Finally, we shall indiscriminately refer to distributor tubes, conduits or channels.

In particular, the present invention is applicable in all cases:

where gas phases are in the majority with respect to the liquid phases, i.e., where the volume ratio between the gas and liquids is usually more than 3:1 and normally less than 400:1 (3<gas volume/liquid volume<400);

where the gas phases are in the minority with respect to the liquid phases, i.e., where the volume ratio between the gas and liquids is usually more than 0.1:1 and normally less than 1:1 (0.1<gas volume/liquid volume<1);

where the reaction is highly exothermic and requires the introduction of a supplementary fluid into the reactor, usually a gas, to cool the gas/liquid mixture;

The present invention is of particular application to gas/liquid distributors such as those used to implement hydrocracking, hydrotreatment, hydrodesulphurisation, hydrodenitrogenation, selective or complete hydrogenation of $C_2$ to $C_5$ cuts, selective hydrogenation of steam cracking gasoline, hydrogenation of aromatic compounds in aliphatic and/or naphthenic cuts, and hydrogenation of olefins in aromatic cuts.

It is also of application to carrying out other reactions requiring good distribution of a gas phase with a liquid phase, for example partial or complete oxidation reactions, amination, acetyloxidation, ammoxidation and halogenation reactions, in particular chlorination.

In the specific field of hydrodesulphurisation, hydrodenitrogenation and hydrocracking reactions to produce high conversions (to obtain a product containing, for example, 30 ppm (parts per million) of sulphur or less), the distribution of both gas and liquid must be good, but principally the liquid distribution must be good, as the volume ratios are generally between about 3:1 and about 400:1, usually between about 10:1 and about 200:1 when using a quench gas, very good contact must be achieved between the gas introduced to cool the process fluids and those fluids.

In the distribution system described in the present invention, the two fluids to be distributed are in the most general case introduced via two separate lines. In a preferred embodiment, said fluids are generally constituted by a gas phase and a liquid phase. The liquid and gas phases are injected towards a granular bed that is generally catalytic placed at the distributor outlet; the phases are in a physically separated form but with a homogeneous distribution (gas bubbles dispersed in the liquid phase). Without departing from the context of the invention, the present device can also be used in all cases where the two fluids to be distributed are in different physical states or are not miscible.

French patent FR-A-2 654 952 (Henkel, 1990) proposes a distribution system integrating a separation chamber at the reactor head that acts as a pre-distributor and a conduit plate for injection of gas and with holes for injecting liquid. The gas conduits contain baffle systems intended to prevent the catalyst from rising. The disadvantage of such a plate is its lack of flexibility as regards the liquid flow rate. To take large variations of liquid flow rate into account, the gas conduits have to be very long.

U.S. Pat. No. 5,799,877 proposes a plate system with conduits for injecting gas and with conduits for injecting a liquid. The liquid conduits and gas conduits are concentric. To take variations in liquid flow rates into account, three different heights are selected for the conduits. The disadvantage of that plate is in varying the number of liquid injection points when the liquid flow rate is varied. In particular, low liquid flow rates, which are more difficult to distribute, are injected at a smaller number of points.

The use of a vessel to inject a liquid into a fixed bed reactor has been recommended by Sato et al., (Journal of Chemical Engineering of Japan, Vol. 6, page 147 (1963)). In that system, carried out to measure the liquid retention within the bed, that liquid is introduced by means of tubes directly in contact with the granular spheres contained in the catalytic bed, such a disposition does not permit satisfactory distribution of the fluid upstream of the device.

In general, the present invention concerns a device that is placed in a vessel for carrying out separate injection and homogeneous distribution downstream of said device of two fluids in two different physical states, or which are not miscible. The first fluid is injected into the vessel at at least one point level with said device, and said second fluid is injected into the vessel at at least one point upstream of said device, which comprises a chamber pierced by orifices for the passage of a first fluid. Said chamber (5) is also imperviously traversed by tubes or conduits with a free end acting as a passage for the second fluid through said chamber. The term "imperviously" means that there is no possibility of material exchange over the entire length of the conduits between the fluid contained in the vessel and the fluid traversing said conduits. The term "free end" means that the end of the tubes does not come into contact with the distribution means, the bed of granular solid and/or the walls of the column.

In one possible embodiment of the present device, said vessel is a distillation column.

The device of the present invention can also be used in the context of the invention in any known type of distillation column, including a reactive column, i.e., a distillation column comprising a solid granular bed, preferably a catalyst, to ensure good distribution of fluids and optimise contact between the two phases to be separated. As an example, the use of such a device in a plate column at the column head or between two successive plates of said column can also be envisaged with a view to distributing the liquid in a homogeneous manner at the column head or re-distributing into an intermediate portion of the column. In the case of packing columns, dispersion of the liquid flow at the column head by means of the device of the invention can advantageously maximise the contact surface between the packing material and the liquid phase and avoid the formation of by-passes that may be detrimental. In the case where said column comprises several packing zones, it is also possible within the context of the invention for the present device to be disposed between two successive zones.

In the case where the device of the invention is used in a distillation column, the liquid/gas flow is preferably envisaged as a gas upflow and liquid downflow. In such an implementation, the conduits pass gas from the bottom to the top while the liquid is injected into a gas upflow, the device ensuring proper distribution and thus good contact between the two phases.

In a further example, said vessel is a reactor in which at least one bed of granular solid is disposed downstream of said device. The bed of granular solids advantageously comprises particles with a catalytic activity or adsorbents or a capture mass.

In one implementation of the device of the invention, the first fluid is essentially liquid and the second fluid is essentially gaseous.

It is possible in accordance with the invention to place said device close to the head of said vessel. Advantageously, said vessel is supplied at at least one point by injecting a first fluid level with said device substantially radially with respect to the principal axis of the vessel. The term "substantially" as used here means that the deviation with respect to the perfectly radial position is in the range 0 to 30°, preferably in the range 0 to 20°, and highly preferably in the range 0 to 10°.

Preferably, the second fluid is injected substantially along the principal axis of the vessel. The term "substantially" as used here means that the deviation with respect to the perfectly radial position is in the range 0 to 30°, preferably in the range 0 to 20°, and highly preferably in the range 0 to 10°.

In a preferred implementation, said tubes extend below the vessel by a distance $h_r$. Generally, said distance $h_r$ is in the range 1 to 100 mm, preferably in the range 10 to 50 mm.

In one embodiment of the device of the invention, the orifices allowing passage of the first fluid are holes distributed between the tubes for injecting the second fluid.

In a further embodiment, said orifices are annular slots located around the tubes for injecting the second fluid.

The present invention is of particular application in hydrodesulphurisation, selective hydrogenation or hydrodenitrogenation processes.

The present invention advantageously overcomes the problems described with respect to the prior art. In contrast to the preceding devices, the present device is highly flexible as regards the liquid phase flow rate, and avoids problems connected with stabilising the interface between the two fluids to be mixed and to fluctuations in the liquid level upstream of the distributor plate. In an original manner, the present device can also overcome problems with the evenness of the distributor plate and in particular problems with liquid distribution connected with a possible inclination of said plate with respect to the horizontal. This "deviation from the horizontal" over systems a few metres in diameter is capable of causing large differences in liquid flow rate at the outlet from said distributor.

For a better comprehension of the invention, FIGS. 1 and 2 provide non-limiting examples of embodiments of a device in accordance with the invention in the case where the device is used in a reactor.

In FIG. 1, an internal distribution means is placed, for example, at the head of a reactor upstream of a fixed catalytic bed that can function with a liquid flow alone or with a liquid/gas co-current downflow.

FIG. 2 illustrates two possible embodiments of the invention.

FIG. 3 shows an embodiment in which the device is used in a distillation column.

In the embodiment of FIG. 1, an essentially gaseous phase is injected via a conduit (1) into the distributor plate substantially along the principal axis of a reactor into a vessel filled with gas (2). When said phase comprises a non-negligible quantity of liquid, a jet-breaking device, not shown in FIG. 1, can optionally be inserted at the head of the reactor. Said gas then flows through tubes (4) that imperviously traverse a liquid chamber (5) before entering a solid granular bed (12), for example a catalytic bed, located downstream of the device. The chamber is supplied by injecting a liquid feed through injection lines (6) substantially radially with respect to the principal reactor axis. This liquid chamber is kept filled, i.e., continuously filled with liquid, said liquid being injected into the bed from this chamber through the orifices. The liquid chamber is kept filled using any technique that is known to the skilled person, in particular by the presence of a purge valve, not shown in FIG. 1, for evacuating residual gas. In a first embodiment of the invention, shown in FIG. 2, said orifices are holes (7) the distribution of which over the entire lower surface of the liquid vessel and between the tubes for injecting gas phase is calculated using any technique that is known to the skilled person to obtain homogeneous fluid distribution.

In a second embodiment, also shown in FIG. 2, the orifices are annular slots located around said tubes (8).

The operating principle is to independently control gas injection (number of injection points and diameter of the conduit influencing the average gas bubble size and injection of liquid and the orifice and density size). As already stated above, the use of a filled liquid chamber for liquid injection overcomes problems with inclination or deviation from the horizontal of the distributor plate and fluctuations in the liquid level in the distributor plate and provides great flexibility as regards the range of liquid flow rates that can be used. In the case where the liquid orifices are annular slots (8), the operating principle consists of using the kinetic energy of the liquid to fractionate the gas jet from tube (4). In this case, any known means for preventing or limiting vibration in said tubes at the annular slots surrounding them can be envisaged. The diameter (9) of tubes (4) is generally calculated so as to provide a gas pressure drop at the distributor inlet in the range 5 to 100 mbar (1 millibar=100 pascals) and preferably at least 10 mbar, to optimise gas distribution between the different conduits. This diameter is optimised using any known technique as a function of the gas/liquid volume ratio in the flow. If the ratio is more than 50%, the conduits supply the bed with a continuous gaseous phase, and their diameter is then generally in the range 5 to 100 mm, advantageously in the range 10 to 50 mm. The density of the conduits per square meter is advantageously at least over 100 conduits/m², in general in the range 100 to 700 conduits/m², and preferably in the range 150 to 500 conduits/m², to ensure distribution of the gas/liquid injection points at the head of the catalytic bed. If said ratio is less than 50%, the purpose of the conduits is to create bubble type structures and their diameter is preferably in the range 0.5 to 10 mm, more preferably in the range 1 to 5 mm. The conduit density will generally be in the range 500 to 1500 conduits/m², preferably in the range 600 to 1000 conduits/m². Finally, tubes (4) advantageously extend below the liquid chamber (5) by a distance $h_t$ (10) so that the gas bubbles are injected downstream of the liquid flow, to optimise dispersion of the gas in the liquid and to reduce the distance between the fluid injection point and the inlet to the granular bed. The distance $h_t$ is advantageously in the range 1 to 100 mm, preferably in the range 10 to 50 mm and more preferably in the range 20 to 40 mm. Then, to encourage homogeneous distribution of fluids before their injection into the bed, the distance between the end (13) of tubes (4) and the top of the bed is preferably in the range 0 to 50 mm, 0 excluded, more preferably in the range 0 to 20 mm, 0 excluded, and more preferably in the range 0.5 to 20 mm, or even in the range 1 to 20 mm. The diameter and number of orifices are calculated using any technique that is known to the skilled person to keep the liquid chamber (5) filled for the lowest liquid flow rate. Thus, since the liquid chamber (5) is constantly full of liquid, there is no problem with the liquid level fluctuating upstream of the liquid injection points, nor is there any influence of the evenness of the plate on liquid injection. The height (11) of the liquid chamber can be determined as a function of the reactor operation conditions using any technique that is known to the skilled person. In general, it is in the range 100 to 300 mm, preferably in the range 100 to 200 mm. Where the liquid orifices are holes (7), the density of these holes will be more than 100 holes/m², advantageously in the range 0.5 to 1 time the density of the tubes. The diameter of holes (7) is preferably generally more than 3 mm. When the orifices are annular slots (8), the density is preferably equal to that of the gas injection tubes (4), and the width of said slot is advantageously more than 3 mm.

In the embodiment shown in FIG. 3 (distillation column), gas (37) from the distillation flows upwards through the tubes (4) and leaves the column via line (31).

The chamber is supplied by injecting liquid feed substantially radially with respect to the principal reactor axis through injection lines (6). This liquid chamber is kept full, i.e., continually filled with liquid, said liquid being injected into the column from this chamber through the orifices, along a path (38) shown in FIG. 3. The other numerated elements shown in FIG. 3 are identical to those shown in FIG. 1. The orifices of the liquid chamber can be disposed in a plurality of manners, in particular those described above and shown in FIG. 2.

In summary, the device of the invention is a device that is placed in a vessel (3) for carrying out separate injection of two fluids in two different physical states, or which are not miscible, and for homogeneous distribution in the vessel of at least one of the two fluids downstream of said device, the first fluid being injected into the vessel at at least one point level with said device. Said device comprises a chamber (5) pierced by orifices (7, 8) for the passage of a first fluid, said chamber (5) also being imperviously traversed by tubes (4) or conduits with a free end acting as a passage for the second fluid through said chamber.

In a variation, said vessel is a distillation column in which the first fluid is essentially liquid and the second fluid is essentially gaseous, and said essentially gaseous fluid traverses said device from downstream to upstream via said conduits in said column. The flow of the essentially gaseous fluid is upwards and the flow of essentially liquid fluid is downwards.

In a further variation of the invention, said vessel is a reactor in which at least one bed of granular solid (12) is disposed downstream of said device and the flows of the two fluids are downwards and co-current. The second fluid is injected into the vessel at at least one point upstream of said device.

Figure 1:
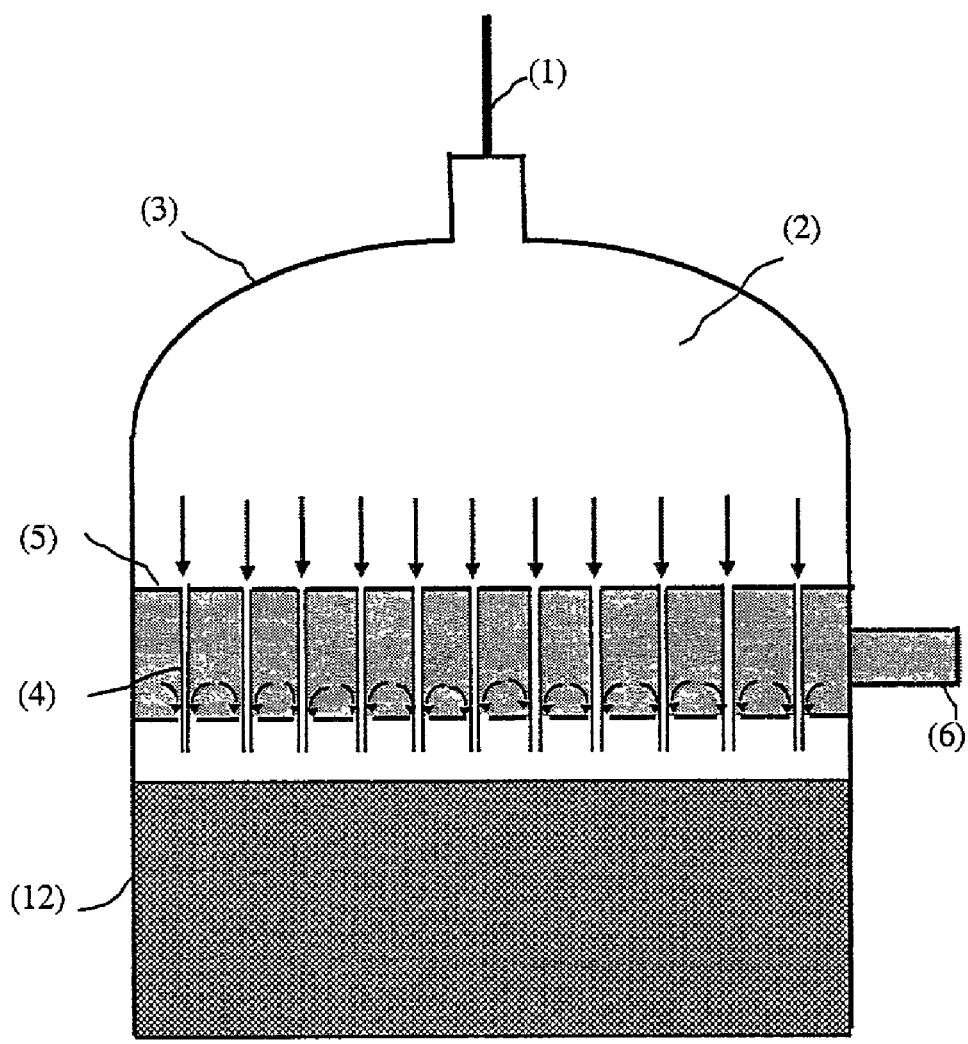
FIG. 1—Shows an embodiment where the device is used in a reactor.
Figure 2:
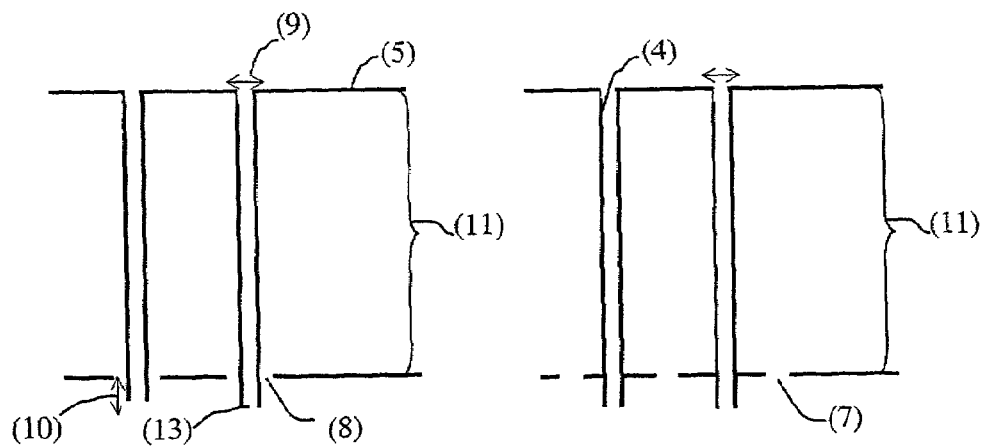
FIG. 2—Shows two embodiments of the device.
Figure 3:
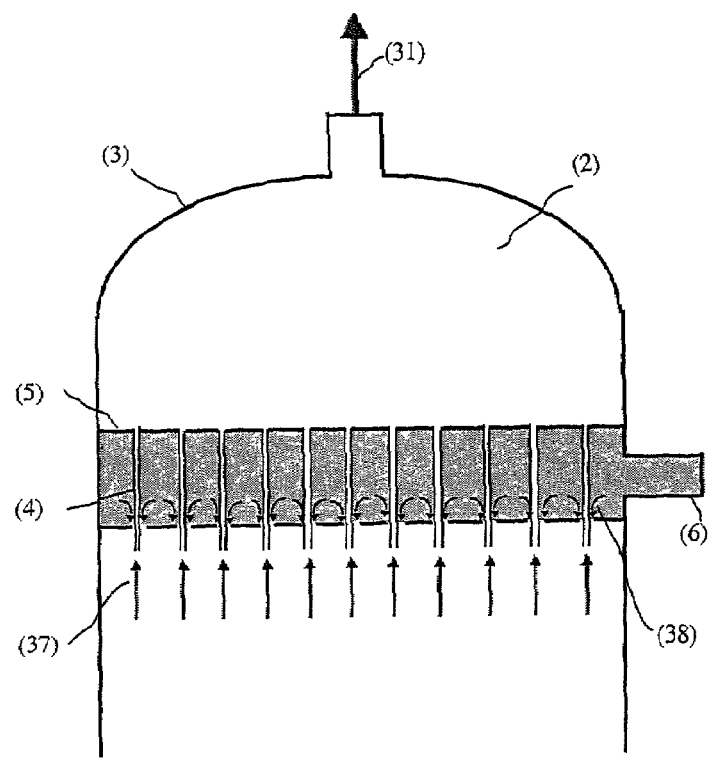
FIG. 3—Shows an embodiment where the device is used in a distillation column.

The invention claimed is:

1. Apparatus comprising a vessel and an injection device having a top and bottom inside said vessel for carrying out separate injection of first and second fluids which are in two different physical states or which are not miscible, and for homogeneous distribution in the vessel of at least one of the fluids downstream of said device, said device comprising a chamber (5) which is supplied by the first fluid, and which chamber comprises orifices (7, 8) on the bottom of the device for the passage of the first fluid, said device further comprising elongated conduits extending downwardly through said chamber, said conduits being imperforate within said chamber and having free ends at the bottom of the device outside said chamber acting as a passage for the second fluid through said chamber, said apparatus further comprising means for introducing the first fluid into the chamber.

2. Apparatus according to claim 1, wherein said vessel is a distillation column in which the first fluid is essentially liquid and the second fluid is essentially gaseous.

3. Apparatus according to claim 1, wherein said vessel is a reactor in which at least one bed of granular solid (12) is disposed downstream of said injection device.

4. Apparatus according to claim 1, wherein said vessel comprises a head section, and said device is placed close to the head section of said vessel.

5. Apparatus according to claim 1, comprising conduits (4) extending below the chamber (5) by a distance $h_t$ (10).

6. Apparatus according to claim 5, in which said distance $h_t$ (10) is 1 to 100 mm.

7. Apparatus according to claim 3, in which the distance between the end (13) of the conduits (4) and the top of the bed (12) is 0 to about 50 mm, 0 excluded.

8. Apparatus according to claim 1, in which said orifices allowing passage of the first fluid are holes distributed between the conduits for injecting the second fluid.

9. Apparatus according to claim 1, in which said orifices for passage of the first fluid are annular slots located around the conduits for injecting the second fluid.

10. Apparatus according to claim 1, wherein said vessel is a distillation column.

11. An apparatus according to claim 1, wherein said vessel is a distillation column comprising a head section, in which the first fluid is essentially liquid and the second fluid is essentially gaseous, the essentially gaseous fluid traverses said device from downstream to upstream via said conduits in said column, wherein said essentially gaseous fluid flows upwards and the essentially liquid fluid flows downwards, wherein said device is placed close to the head section of said vessel, the distance between the end of said conduits (4) and the top of at least one bed of granular solid (12) is 0 to about 50 mm, 0 excluded, and said orifices are annular slots located around the conduits for inserting said second fluid.

12. An apparatus according to claim 1, wherein said vessel is a reactor comprising a head section, in which at least one bed of granular solid (12) is disposed downstream of said injection device, the flows of the two fluids are downwards and co-current, the second fluid is injected into the vessel at a point upstream of said device, said device is placed close to the bead section of said vessel, and the distance between the end of said conduits (4) and the top of said bed (12) is 0 to about 50 mm, 0 excluded.

13. An apparatus according to claim 1, wherein the device is located at a height H within the vessel and where the means for introducing the first fluid is located at about said height H.

14. Apparatus according to claim 1, wherein both the first and second fluids are homogeneously distributed in the vessel downstream of the device.

* * * * *

UNITED STATES PATENT AND TRADEMARK OFFICE
CERTIFICATE OF CORRECTION

| | |
|---|---|
| PATENT NO. | : 7,029,638 B2 |
| APPLICATION NO. | : 10/024382 |
| DATED | : April 18, 2006 |
| INVENTOR(S) | : Christophe Boyer et al. |

It is certified that error appears in the above-identified patent and that said Letters Patent is hereby corrected as shown below:

Column 8, line 3, reads "the bead section" should read -- the head section --

Signed and Sealed this

Twenty-seventh Day of February, 2007

JON W. DUDAS
*Director of the United States Patent and Trademark Office*